United States Patent
Barth et al.

(10) Patent No.: US 6,876,443 B2
(45) Date of Patent: Apr. 5, 2005

(54) PROCESS AND APPARATUS FOR AUTOMATICALLY DETERMINING THE MODULATION TRANSFER FUNCTION OF FOCAL PLANE ARRAY CAMERAS

(75) Inventors: Jochen Barth, Oberschleissheim (DE); Michael Assel, Dachau (DE); Yvonne Polin, Weil der Stadt (DE)

(73) Assignee: LFK-Lenkflugkoerpersysteme GmbH, Unterschleissheim (DE)

( * ) Notice: Subject to any disclaimer, the term of this patent is extended or adjusted under 35 U.S.C. 154(b) by 293 days.

(21) Appl. No.: 10/284,136

(22) Filed: Oct. 31, 2002

(65) Prior Publication Data

US 2003/0086079 A1 May 8, 2003

(30) Foreign Application Priority Data

Oct. 31, 2001 (DE) ......................... 101 53 237

(51) Int. Cl.⁷ ............................. G01M 11/00; G01B 9/02
(52) U.S. Cl. .................................... 356/124.5; 356/484
(58) Field of Search ...................... 382/100; 356/124.5, 356/484

(56) References Cited

U.S. PATENT DOCUMENTS

| | | | |
|---|---|---|---|
| 5,191,621 A | * | 3/1993 | Brok ...................... 382/100 |
| 5,621,519 A | * | 4/1997 | Frost et al. .............. 355/124.5 |
| 5,661,816 A | | 8/1997 | Fantone et al. |
| 5,959,726 A | * | 9/1999 | Riley et al. ............... 356/124.5 |
| 2003/0067595 A1 | * | 4/2003 | Alderson et al. ........ 356/124.5 |

FOREIGN PATENT DOCUMENTS

EP 0 460 749 A 12/1991

OTHER PUBLICATIONS

Vollmershausen et al., *Analysis of Sampled Imaging Systems* (2000), The International Society for Optical Engineering.

Tzannes et al., *Measurement of the Modulation Transfer Function of Infrared Cameras* (1995), Optical Engineering, vol. 34, No. 6.

* cited by examiner

Primary Examiner—Gregory J. Toatley, Jr.
Assistant Examiner—Patrick Connolly
(74) Attorney, Agent, or Firm—Crowell & Moring LLP (57) ABSTRACT

In a process for automatically determining the modulation transfer function (MTF) of a focal plane array (FPA) cameras, a test grid is used to generate a beat whose amplitude corresponds to that of the grid image to be measured, without the sampling MTF. (The image of the test grid has a spatial frequency in the detector plane that is detuned with respect to the Nyquist frequency of the detector array. The test grid covers a range of at least half a beat period, and then, regardless of the actual phase position, the modulation amplitude is determined therefrom. Comparative MTF measurements are thereby permitted without the influence of the sampling effect of an FPA, and particularly the MTF measurement in real time suitable for the application to moving images.

5 Claims, 9 Drawing Sheets

FIG. 3a SINUSOIDAL BEAT

FIG. 3b SINUSOIDAL BEAT CLOSE TO NYQUIST/2

• GRAY VALUE OF PIXELS

FIG. 4a  ALIGNMENT OF THE BEAT GRID

FIG. 4b  BEAT GRID WITH SPACER MARKERS

CREF: REFERENCE CONTRAST FOR SPATIAL FREQUENCY O
O: OFFSET OF THE DETERMINED SINE-/COSINE-FUNCTIONS

PROCESS AND APPARATUS FOR AUTOMATICALLY DETERMINING THE MODULATION TRANSFER FUNCTION OF FOCAL PLANE ARRAY CAMERAS

BACKGROUND AND SUMMARY OF THE INVENTION

This application claims the priority of German patent document 101 53 237.7, filed Oct. 31, 2001, the disclosure of which is expressly incorporated by reference herein.

The invention relates to a process for automatically determining the modulation transfer function (MTF) of a focal plane array (FPA) camera and a system for its implementation.

Various measuring methods are known for determining the MTF, for example, from Vollmershausen and Driggers, "Analysis of Sampled Imaging Systems", Bellingham, Wash., 2000. Traditional techniques require static imaging of a test structure onto the detector plane.

One object of the invention is to provide a system that can measure the modulation transfer function MTF of a focal plane array (FPA) camera in real time. Such a system is particularly advantageous in the case of a moving camera or moving scenery, or when measuring the residual stabilization error while exciting vibrations.

This and other objects and advantages are achieved by the method and apparatus according to the invention, for automatically determining the MTF of an FPA camera, in which a test grid is used to generate a beat whose amplitude corresponds to that of the grid image to be measured, without the sampling MTF. The image of the test grid has a spatial frequency in the detector plane that is detuned with respect to the Nyquist frequency of the detector array. The test grid covers a range of at least half a beat period, and then, regardless of the actual phase position, the modulation amplitude is determined therefrom. Comparative MTF measurements are thereby permitted without being affected by the sampling effect of an FPA, and particularly the MTF measurement in real time, which is suitable for application to moving images.

Other objects, advantages and novel features of the present invention will become apparent from the following detailed description of the invention when considered in conjunction with the accompanying drawings.

BRIEF DESCRIPTION OF THE DRAWINGS

FIG. 3.$a$ is a general view of a sinusoidal beat signal;

FIG. 3.$b$ is a view of beat fractions in the proximity of half the Nyquist frequency;

FIG. 4.$a$ is a view of the alignment of the used beat grid;

FIG. 4.$b$ is a view of the beat grid with range markers;

FIG. 4.$c$ the graphic representation of the sine or cosine fit;

FIGS. 5.$a$ to 5.$d$ are views of measuring results with various fit parameters.

DETAILED DESCRIPTION OF THE DRAWINGS

Theoretical Observation

Figures 1, 2:
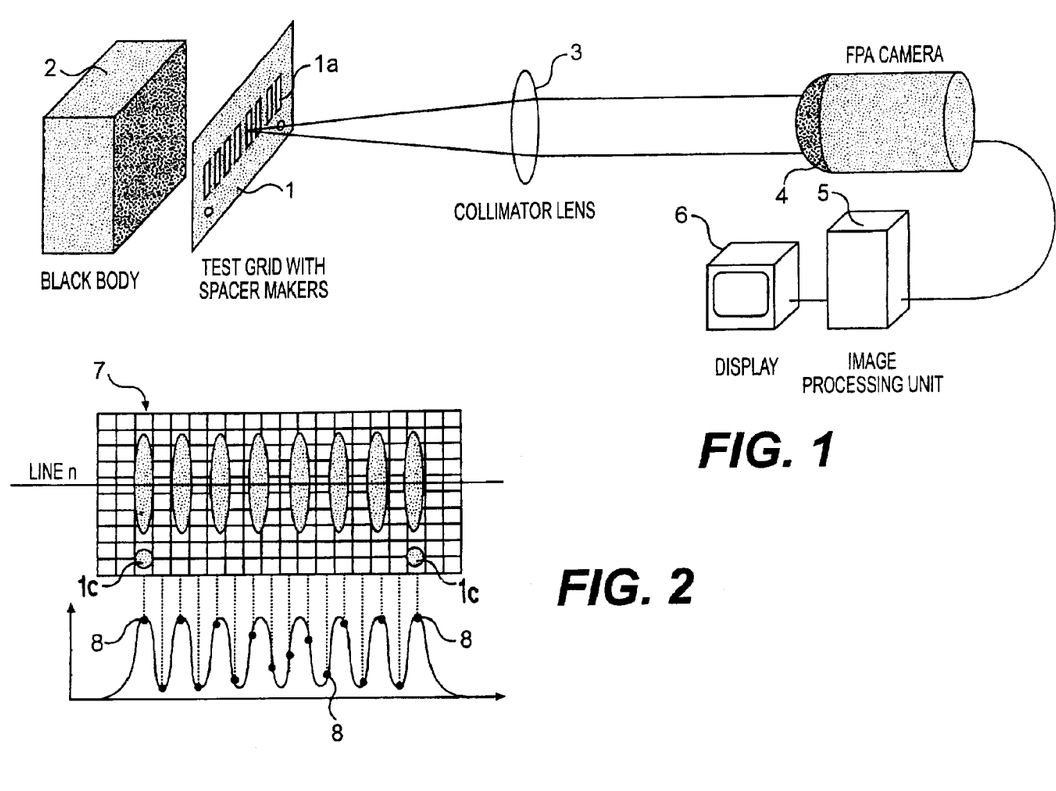
FIG. 1 is a schematic diagram of apparatus according to the invention for measuring MTF of a focal plane array camera.
FIG. 2 shows the image of a test grid pattern projected onto a detector array of the focal plane array camera of FIG. 1.

FIG. 1 is a schematic diagram of apparatus for measuring the MTF of an FPA camera using the method according to the invention. For this purpose a test grid 1 is positioned in front of a black body 2 so as to mask the illumination from an energy source such as a heating plate (not shown).

Openings 1$a$ in the test grid 1 form a pattern of illumination which is focused via a collimator lens 3, onto a detector array in the detector plane of an FPA camera 4 whose MTF is to be determined. Image data output from the FPA camera is provided to an image processing unit 5, for evaluation in the manner described hereinafter. In addition, a display 6 or other graphic user interface is provided to present output information from the image-processor, in a human readable or detectable format.

FIG. 2 shows the image 1.$b$ of the test grid projected onto an array of detector elements 7 disposed in the detector plane of the FPA camera. An intensity distribution is thus created there whose periodic waveform f(x), shown graphically below the detector array, will be described here by a sinusoidal function:

$$f(x) = \sin\left(\frac{2\pi}{p} * x\right) \qquad \text{Eq. (1.1)}$$

where the x coordinate is oriented perpendicular to the grid gaps, and P indicates the length of the period. The intensity distribution is sampled by individual detector elements at discrete points 8, so that $$f(x_n) = \sin\left(\frac{2\pi}{p} * x_n\right) \qquad \text{Eq. (1.2)}$$

indicates the value of the function which is measured by the nth detector element at the position $x_n$.

If the spatial frequency of the imaged grid structure corresponds precisely to the Nyquist frequency of the detector, two detector elements exist per period. In the latter case . . .

$$x_n = n * \frac{P}{2} \text{ (for Nyquist grid!)} \qquad \text{Eq. (1.3)}$$

However, since the frequency of the imaged grid is to be slightly detuned with respect to the Nyquist frequency of the detector, a summand $\Delta$ is added which indicates the amount of the detuning:

$$x_n = n * \left(\frac{P}{2} + \Delta\right) \qquad \text{Eq. (1.4)}$$

By inserting Equation (1.4) in Equation (1.2), the following is obtained $$f(x_n) = \sin\left(n\pi + n * \frac{2\pi * \Delta}{p}\right) \qquad \text{Eq. (1.5)}$$

$$= \sin(n\pi) * \cos\left(\frac{2\pi * \Delta}{p} * n\right) +$$

$$\cos(n\pi) * \sin\left(\frac{2\pi * \Delta}{p} * n\right)$$

Since n corresponds to the number of detector elements and therefore assumes only integral values, the factor sin (n n) is always equal to 0, while the factor cos(n n) is alternately equal to +1 and −1. Therefore, Equation (1.5) can be simplified to $$f(x_n) = (-1)^n \sin\left(\frac{2\pi}{p^*} * n\right) \text{ with: } P^* = \frac{P}{\Delta} \qquad \text{Eq. (1.6)}$$

This result can be interpreted such that the detector elements 7 measure a periodic waveform of an intensity with the period P* that depends on the amount of the "detuning". This response can be treated as a "beat", and the beat frequency is $$v = \frac{1}{(2\pi P^*)}.$$

Figure 3A:
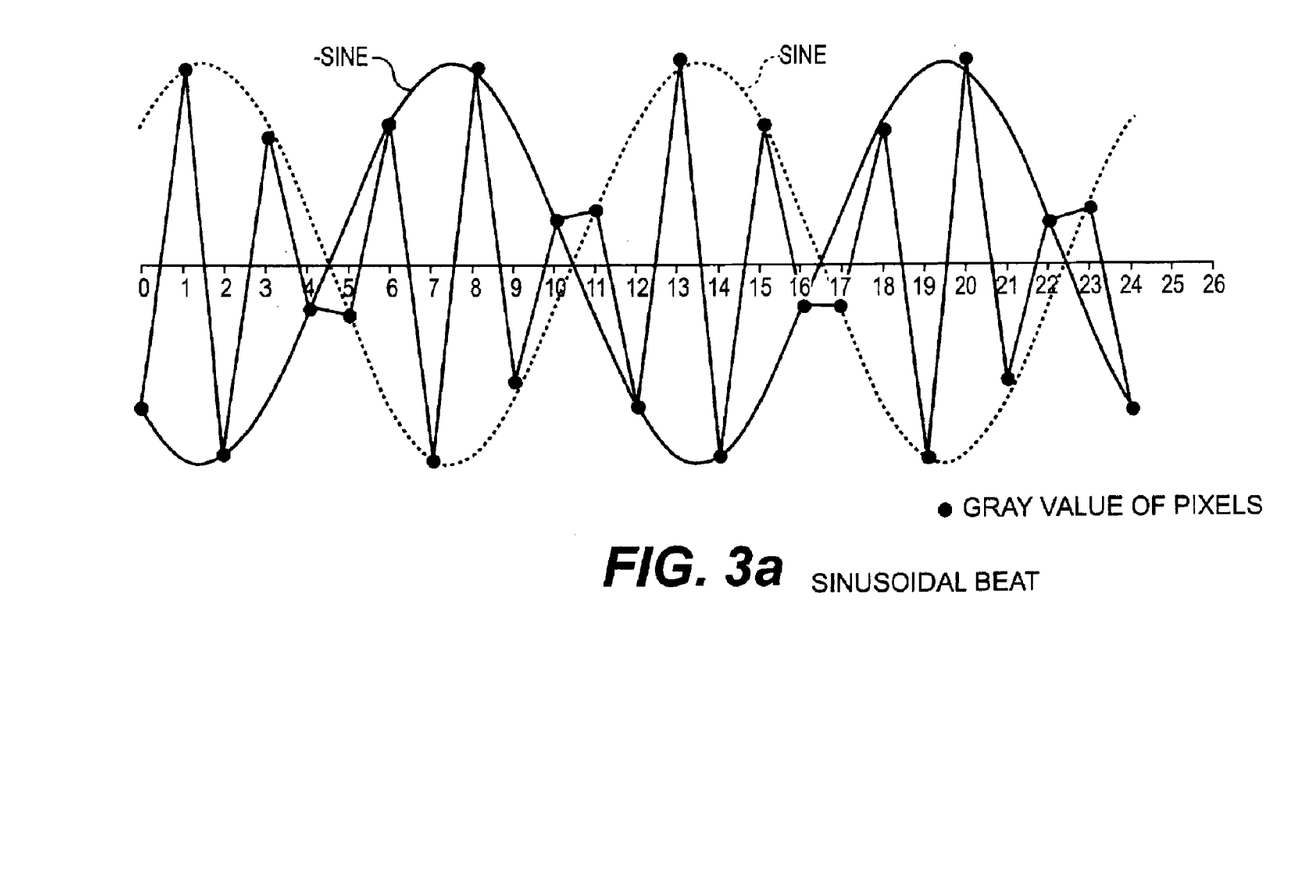

As an example, FIG. 3.*a* shows a measurement with a grid "detuned" with respect to the Nyquist frequency; the period of the beat amounts to approximately 12 pixels. This example also shows that, in accordance with Equation 1.6, the measured values of the intensities are alternately at a positive and a negative sinusoidal function.

It is important that the amplitude of the beat corresponds precisely to the amplitude which is measured in the optimal phase position of the imaged grid. Thus, because the beat function Equation (1.6) is reconstructed from the measured values by means of a fit, and the amplitude is introduced as an adaptable parameter, the desired amplitude of the intensity modulation is obtained even without actually setting the optimal phase position.

In the case of a beat frequency that is generated close to one half of the Nyquist frequency, the analysis is slightly more complicated because, instead of two samples, now four samples per period are present; that is, four detector elements apply to each line pair of the grid. The two oscillatory fractions in the case of the Nyquist frequency become four fractions which, in addition to the sinusoidal oscillations, also contain the positive and negative cosinusoidal oscillations.

If the discrete scanning points $$x_n = n * \left(\frac{P}{4} + \Delta\right) \qquad \text{Eq. (1.7)}$$

are placed in Equation (1.2), the following is obtained:

$$f(x_n) = \sin\left(n * \frac{\pi}{2} + n * \frac{2\pi * \Delta}{P}\right) \qquad \text{Eq. (1.8)}$$

$$= \sin\left(n * \frac{\pi}{2}\right)\cos\left(\frac{2\pi * \Delta}{p} * n\right) + \cos\left(n * \frac{\pi}{2}\right)\sin\left(\frac{2\pi * \Delta}{p} * n\right) \qquad \text{Eq. (1.9)}$$

The cases are therefore differentiated as follows:

Case 1: The Sinusoidal Fractions $$n = 0, 2, 4, \ldots = 2v : f(x_{2v}) = (-1)^v \sin\left(\frac{2\pi}{P^*} * 2v\right) \qquad \text{Eq. (1.10)}$$

with:

$$P^* = \frac{P}{\Delta} = \text{periodicity in } n,$$

periodicity in n, that is, number of pixels or:

$$f_{(0,4,\ldots)} = \sin\left(\frac{2\pi}{p^*} * n\right) \qquad \text{Eq. (1.11)}$$

$$f_{(2,6,\ldots)} = -\sin\left(\frac{2\pi}{p^*} * n\right) \qquad \text{Eq. (1.12)}$$

Case 2: Cosinusoidal Fractions:

$$n = 1, 3, 5, \ldots = 2v + 1 : f\left(x_{2v+1}\right) = (-1)^v \cos\left(\frac{2\pi}{P^*} * (2v+1)\right) \qquad \text{Eq. (1.13)}$$

or:
$$f_{(1,5,\ldots)} = \cos\left(\frac{2\pi}{p^*} * n\right) \qquad \text{Eq. (1.14)}$$

$$f_{(3,7,\ldots)} = -\cos\left(\frac{2\pi}{p^*} * n\right) \qquad \text{Eq. (1.15)}$$

Figure 3B:
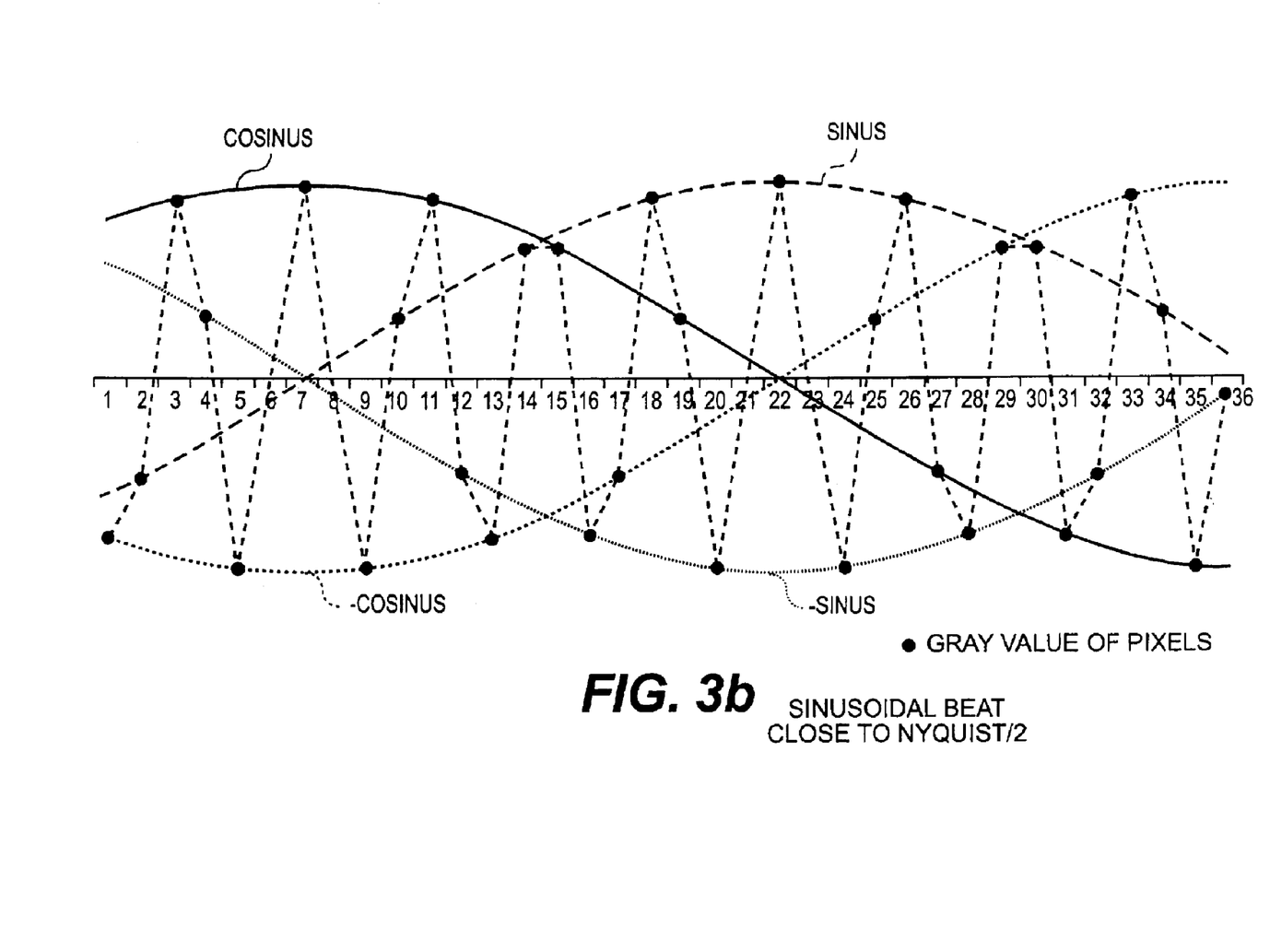

FIG. 3.*b* shows four beat fractions for a computed example with a beat period of 32 pixels.

Each even pixel represents alternately the positive or the negative sinusoidal oscillation, and each odd pixel represents alternately the positive or the negative cosinusoidal oscillation. As a result, the number of pixels or of gray values per oscillatory fraction amounts only to a quarter of the total number.

The Analyzing Software

The software must be capable of reading out the area of the detector chip on which a representative intensity waveform of the beat grid is imaged, and of computing the MTF from the resulting gray value waveform.

Figure 4A:
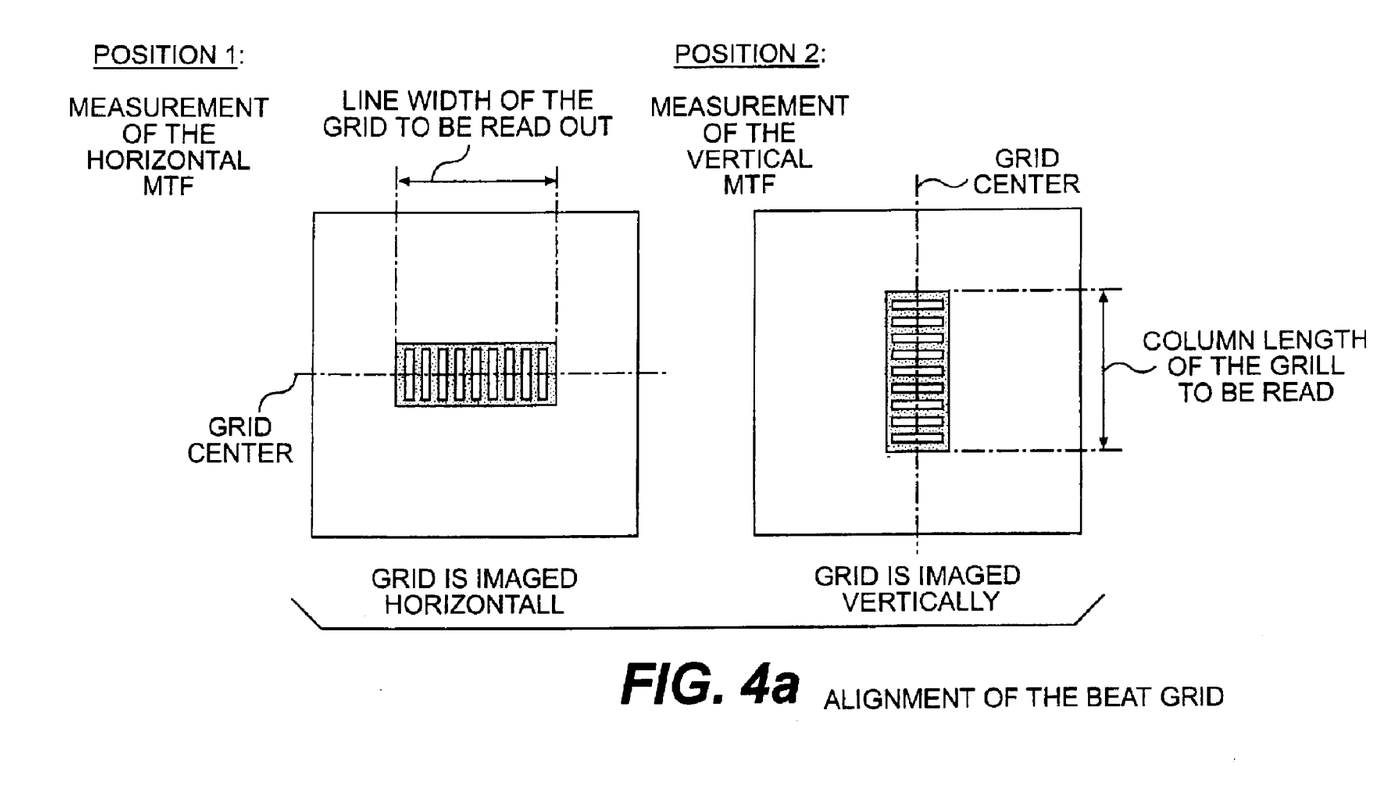

If the image of the test grid shifts in the detector plane (for example, as a result of the vibrations affecting the camera), it should be known for each individual image where the grid is located at the time. Since the MTF of the camera is to be checked in the horizontal as well as in the vertical axis, the grid structure may be aligned horizontally or vertically. (See FIG. 4.*a*.) This should also be automatically detected by the program.

Tracing and Read-Out of the Grid Line

Figure 4B:
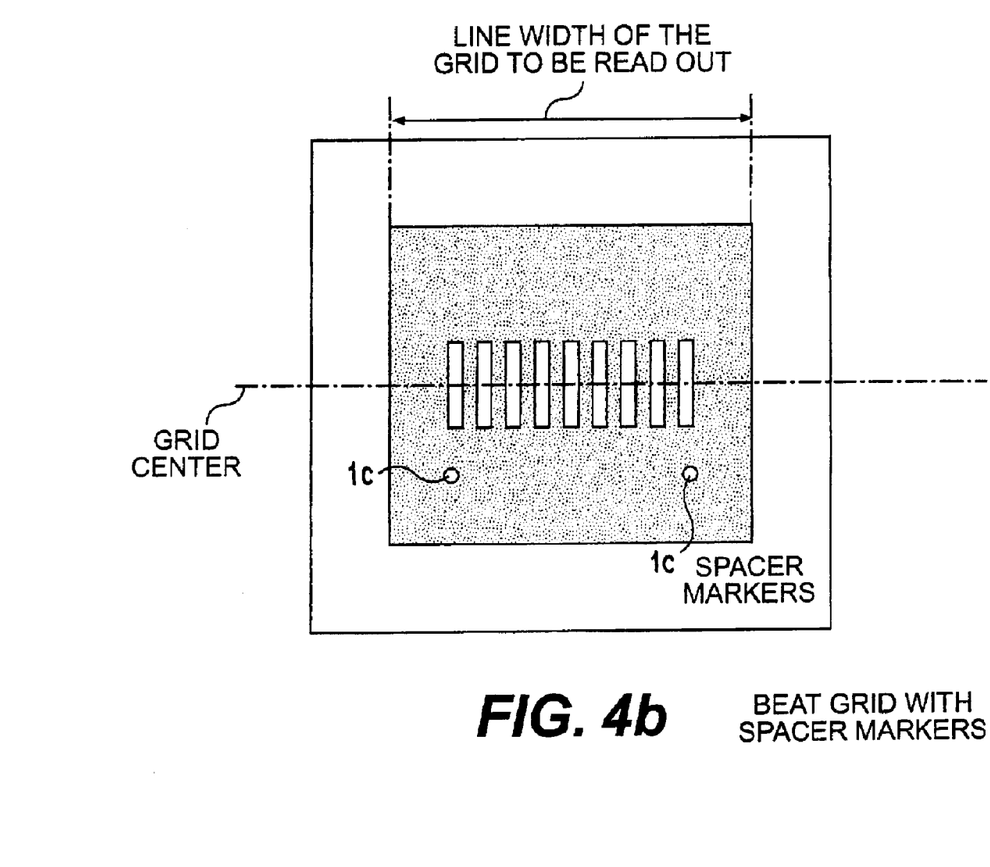
Figure 4C:
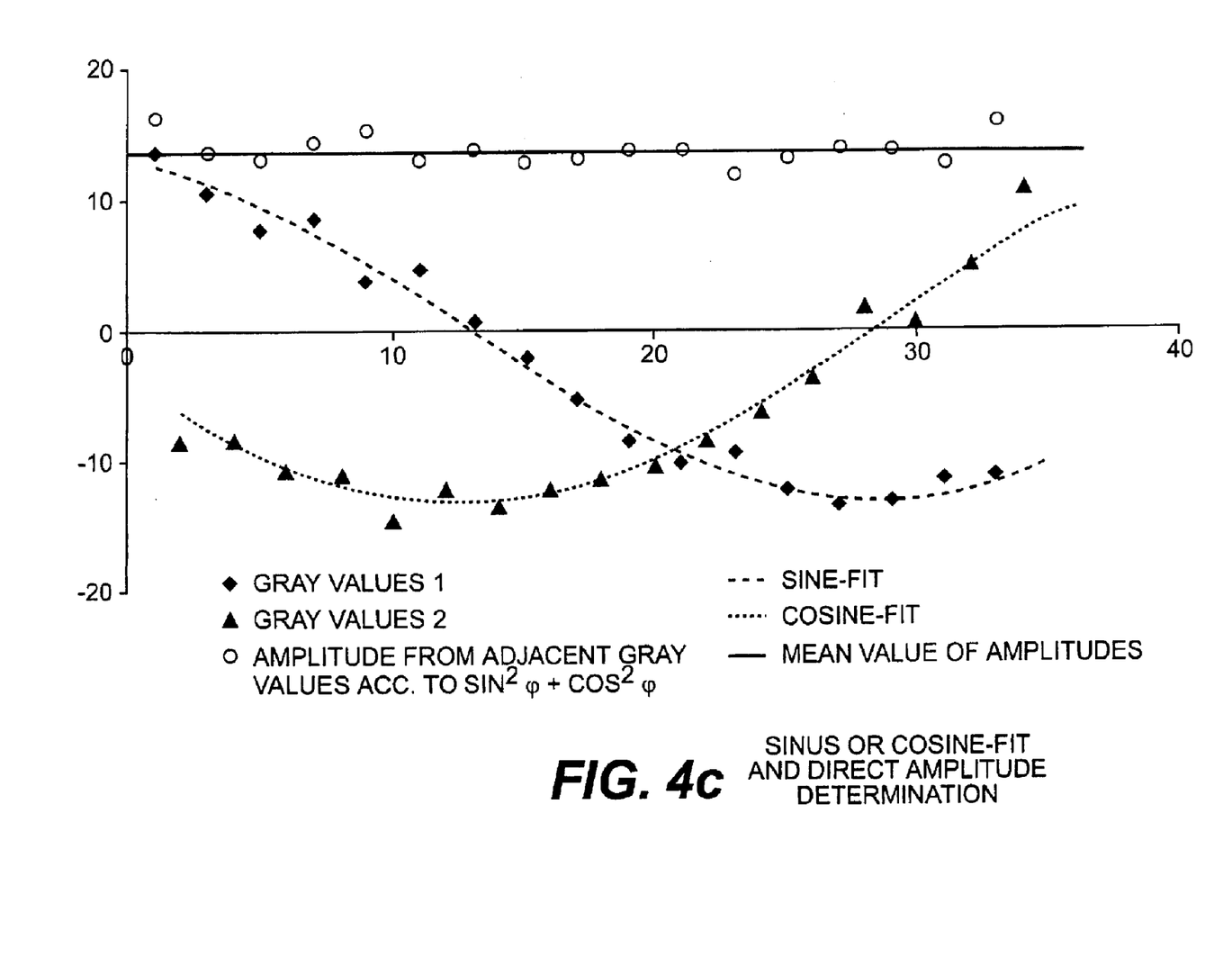
Figure 5A:
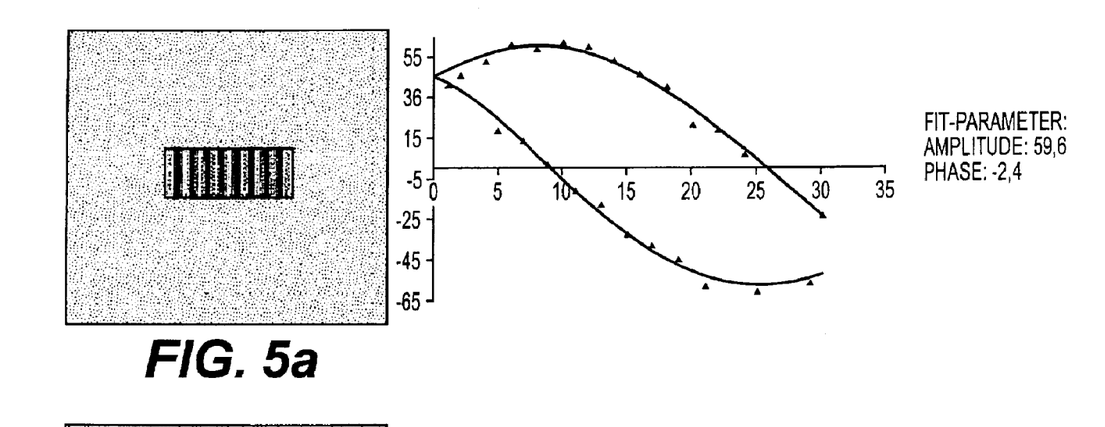
Figure 5B:
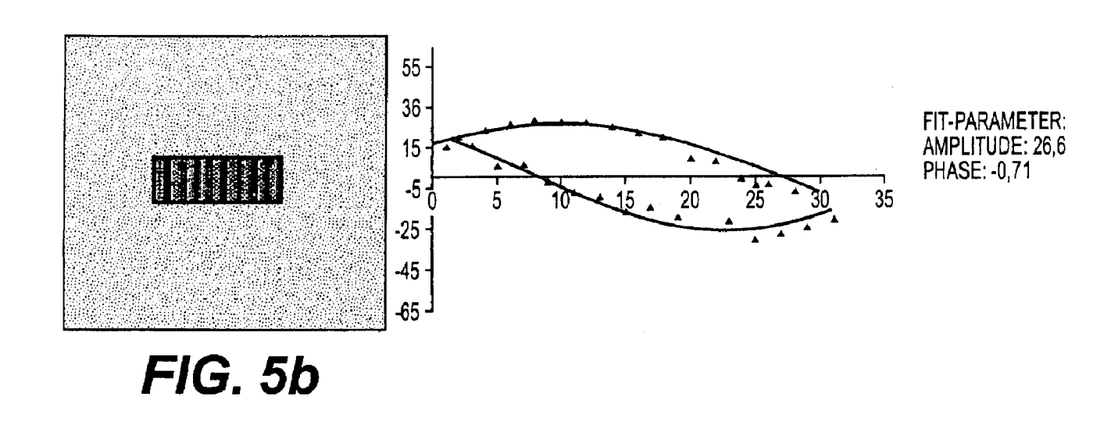
Figure 5C:
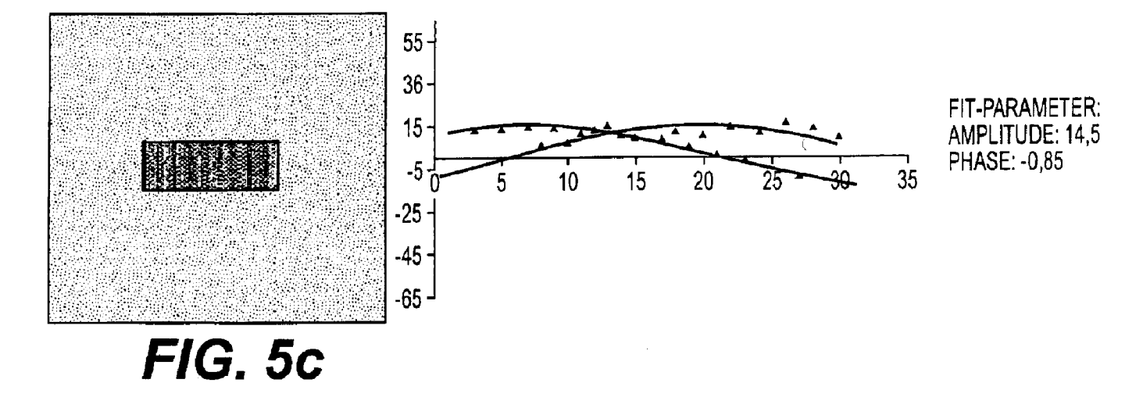
Figure 5D:
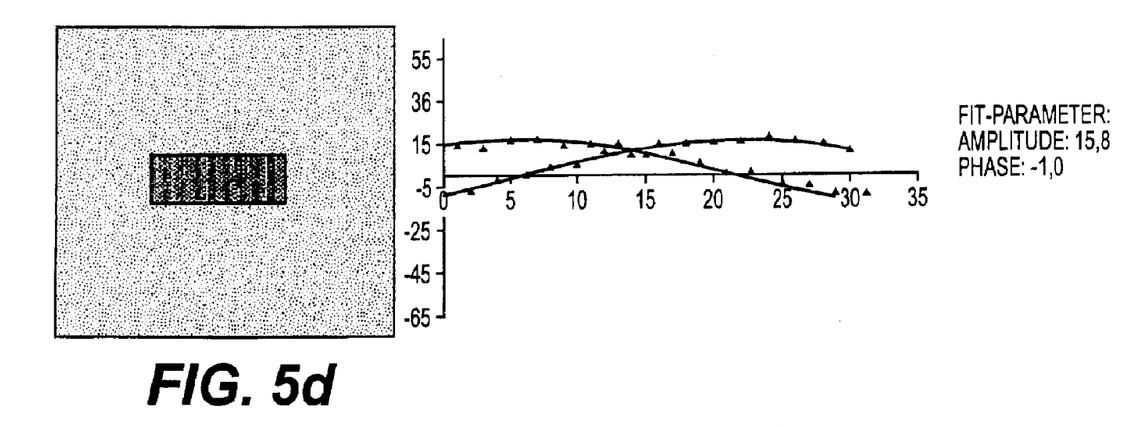

Two markers 1.*c* are placed next to the grid, in the form of two holes which indicate the length of the grid structure and have a defined distance from the grid center. (See FIGS. 2 and 4.*b*.) The holes of the markers appear in the image as bright spots because the heating plate is visible through the holes.

Figure 6:
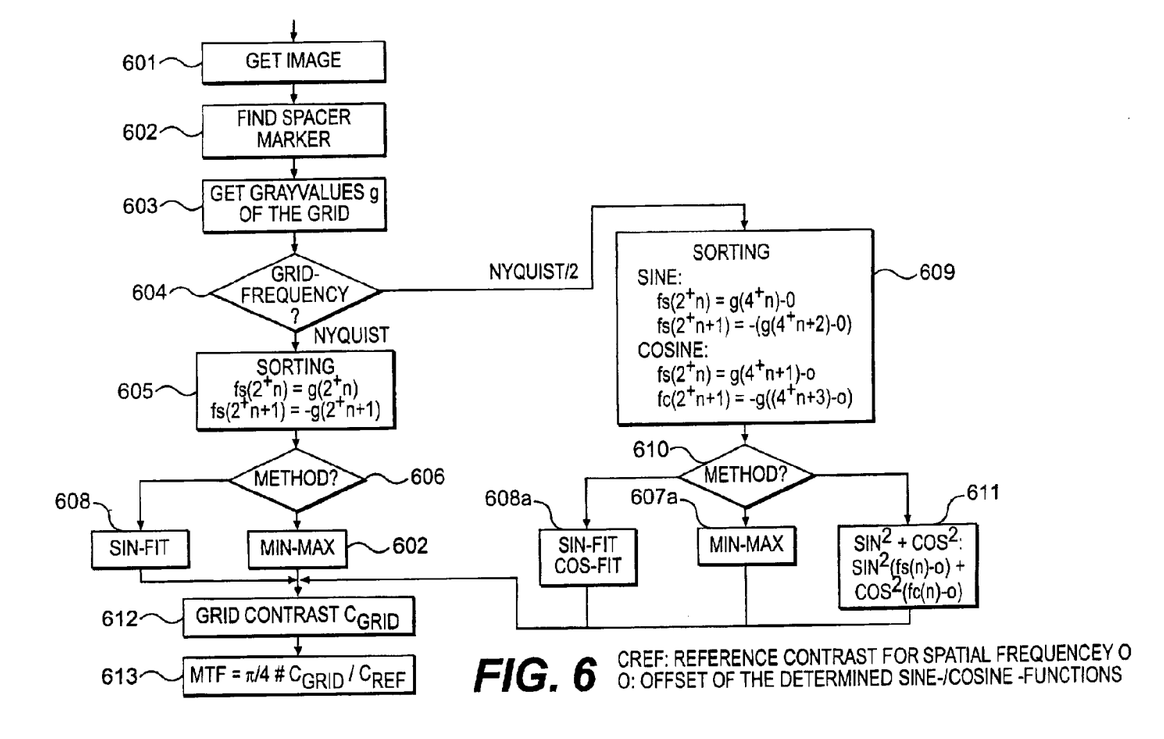
FIG. 6 is a flow diagram that illustrates the processing according to the invention.

The software is depicted in the form of a flow diagram in FIG. 6. After an image is acquired (Step 601), a search is made (Step 602) in each individual image for the brightest gray value in a defined range of pixels around the position of the markers from the preceding individual image. The search area should be sufficient to cover from image to image the jumps that occur in practice, for example, while vibrations of the camera are excited.

When the actual position of the markers has been found, the line or column (line n in FIG. 1) is thereby determined on which the grid center is imaged, and is read out.

Determination of the MTF by Means of Beat Grids

The gray-value waveform of the image of a grid is read out within a line or column in Step 603, and further processing depends on whether the grid frequency is close to the Nyquist frequency, or rather is close to half the Nyquist frequency, as determined in Step 604. In the case of the former, one of two methods may be selected, (Step 606) for further processing (Steps 607 and 608), while in the case of the latter, three alternatives (Steps 607a, 608a and 610) may be selected (Step 610), as discussed below. In either case, the measured values are first sorted in Step 605 or Step 609 as applicable. (See equations 1.6, 1.10 and 1.13)

A) MIN-MAX Method

In the min-max method, the minimum and maximum gray values are determined. The difference between the minimum and maximum values corresponds to the transmitted contrast (Step 612). The latter is the used (Step 13) to calculate the MTF according to $$MTF = \frac{\pi}{4} \cdot C_{grid} / C_{ref} \qquad \text{Eq. (1.16)}$$

Cref being a reference contrast for spatial frequency 0.

This method however results in a systematic error when the gray values are situated such that they do not record the maximum or minimum of the beat amplitude. The presence of noise additionally falsifies the determined amplitude value.

B) Sine Fit

In this method the mean value is determined from the measured gray values, and is subtracted from all measured values. If a beat frequency is analyzed which is generated close to one half of the Nyquist frequency, the measured values thus converted are then further sorted (Step 609) corresponding to Equation (1.10) and Equation (1.13), so that in each case half of all measured values are available for the sine fit and the cosine fit. In this case, it should also be taken into account that, in each group, the preceding sign of each second measured value must be inverted. The actual sine or cosine fit is performed in a manner which is well known to those skilled in the art, using standard numerical techniques.

This process is more precise than the Min-Max method. Moreover, in addition to the amplitude, information is obtained concerning the phase.

C) Direct Amplitude Determination

Since, in the case of measurements close to half the Nyquist frequency, the gray values are distributed to a sinusoidal and a cosinusoidal function of the same amplitude, this amplitude can be determined directly (Step 611), without a fit, by using the relationship.

$$\sin^2 \phi + \cos^2 \phi = 1$$

If, analogous to Point B) above, the mean value is subtracted from the measured gray values, the sum of squares of the gray values of two adjacent pixels respectively results in the square of the modulation amplitude. However, an error occurs because the measured values which are to be assigned to the sinusoidal and cosinusoidal functions are taken at slightly different arguments. The larger the number of the measured values per half period of the sinusoidal or cosinusoidal function the smaller the error is. When the amplitude values thus obtained are averaged over half a period length or an integral multiple thereof, the error will precisely disappear.

Illustrating the Measuring Method by Means of an Image Sequence

To illustrate the method, the MTF measurement on a vibrating camera is shown in the image sequence of FIGS. 5.a to 5.d. The individual images were generated per "screen shot". For this purpose, both the amplitude values and the associated fit curves according to the above-described method B are shown.

This image sequence shows the possibilities of the suggested MTF measuring method: Although the position and the resolution of the imaged test grid changes from one individual image to the next, the transmitted contrast (and thus the MTF) can be determined for each individual image from the fit parameter "amplitude". As a result, the MTF can be determined, as described previously. In the illustrated image, differences in the amplitudes occur to a factor 4. The correlation with the image resolution of the screen shots is evident. The reason for such drastic differences is a noise-type vibration excitation of the camera and as a result an accidental distribution of the camera deflections during an individual image exposure.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A process for the automatically determining a modulation transfer function of focal plane array cameras, said method comprising:

providing a test grid, having an image with a spatial frequency in the detector plane that is detuned with respect to the Nyquist frequency or a rational fraction of the Nyquist frequency, of a detector array of said camera;

using said test grid to generate a beat whose amplitude corresponds to an amplitude of the grid image to be measured, without the sampling the modulation transfer function; wherein the test grid covers a range of at least half a beat period;

regardless of actual phase position, the modulation amplitude is determined therefrom.

2. A process according to claim 1, wherein:

within a line or column, the gray-value waveform of the image of the grid is read out; and thereafter, minimum and maximum gray values are determined, the difference between the minimal and maximal value corresponding to transmitted contrast.

3. The process according to claim 1, wherein:

from measured gray values, a mean value is determined and is subtracted from all measured values to form converted values;

thereafter, the converted values are sorted corresponding to $$n = 0, 2, 4, \ldots = 2v: \ f(x_{2v}) = (-1)^v \sin\left(\frac{2\pi}{P^*} * 2v\right)$$

and $$n = 1, 3, 5, \ldots = 2v + 1; f\left(x_{2v+1}\right) = (-1)^v \cos\left(\frac{2\pi}{P^*} * (2v+1)\right)$$

whereby in each case half of all measured values are available for a sine fit and a cosine fit, in each group a preceding sign of every second measured value being inverted.

4. The process according to claim 1, wherein:

amplitude of the beats is determined directly, without a fit, by subtracting a mean value from the measured gray values;

the sum of squares of the gray values of adjacent pixels respectively results in a square of the modulation amplitude; and the thus obtained amplitude values are averaged over half a period length or an integral multiple thereof.

5. Apparatus comprising:

an energy source;

a test grid having a grid structure for masking energy from said source to form a pattern;

means for focusing said pattern on a detector array in a focal plane camera; and an image processor coupled to receive an output signal from said camera;

wherein the test grid has spacer markers whose spacing corresponds to length of the grid structure.

* * * * *